United States Patent
Janzen et al.

(10) Patent No.: US 8,672,118 B2
(45) Date of Patent: Mar. 18, 2014

(54) CONVEYOR INSTALLATION WITH CARRYING BAGS FOR PRODUCTS TO BE CONVEYED

(75) Inventors: Paul Janzen, Bielefeld (DE); Michael Wend, Bielefeld (DE)

(73) Assignee: Duekopp Foerdertecknik GmbH, Bielefeld (DE)

( * ) Notice: Subject to any disclaimer, the term of this patent is extended or adjusted under 35 U.S.C. 154(b) by 3 days.

(21) Appl. No.: 13/399,398

(22) Filed: Feb. 17, 2012

(65) Prior Publication Data
US 2012/0152697 A1    Jun. 21, 2012

(51) Int. Cl.
*B65G 17/20* (2006.01)
(52) U.S. Cl.
USPC ...................................... 198/678.1; 198/680
(58) Field of Classification Search
USPC ............................................. 198/680, 678.1
See application file for complete search history.

(56) References Cited

U.S. PATENT DOCUMENTS

| | | | | | |
|---|---|---|---|---|---|
| 5,437,231 | A | * | 8/1995 | Janzen et al. | 104/172.4 |
| 6,341,686 | B1 | * | 1/2002 | Beyer | 198/680 |
| 6,431,347 | B1 | * | 8/2002 | Gossner | 198/687.1 |
| 2010/0089722 | A1 | * | 4/2010 | Wiedemann et al. | 198/465.4 |

FOREIGN PATENT DOCUMENTS

| | | | | |
|---|---|---|---|---|
| DE | 4017821 C2 | | 12/1990 | |
| DE | 10354419 A1 | | 6/2005 | |
| DE | 102004018569 | * | 11/2005 | B65G 17/20 |
| DE | 102004018569 A1 | | 11/2005 | |
| DE | 102008026720 A1 | | 12/2009 | |
| DE | EP 2130968 | * | 12/2009 | B65G 9/00 |
| EP | 2130968 | * | 12/2009 | B65G 9/00 |

* cited by examiner

*Primary Examiner* — Ramya Burgess
*Assistant Examiner* — Thomas Randazzo
(74) *Attorney, Agent, or Firm* — Browdy and Neimark, PLLC

(57) ABSTRACT

A conveyor installation has carrying bags, in which products to be conveyed can be transported. In order to ensure an adequate spacing of the carrying bags from one another on back-up sections, the latter have spacers, which can be adjusted between a rest position and a working position.

9 Claims, 5 Drawing Sheets

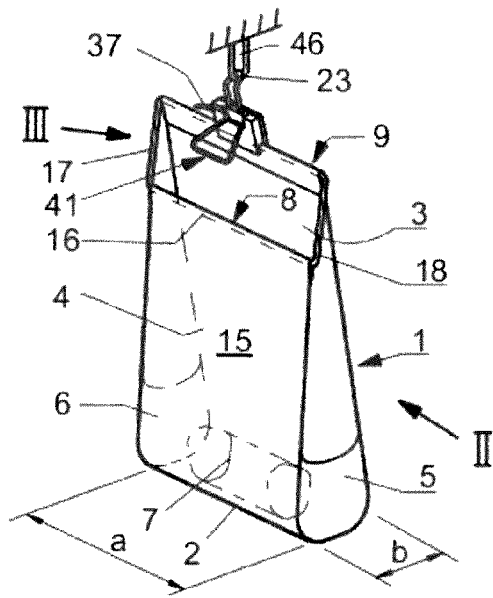
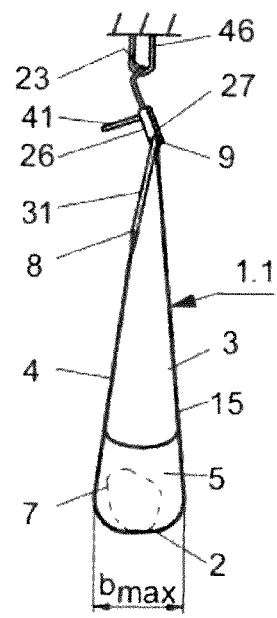
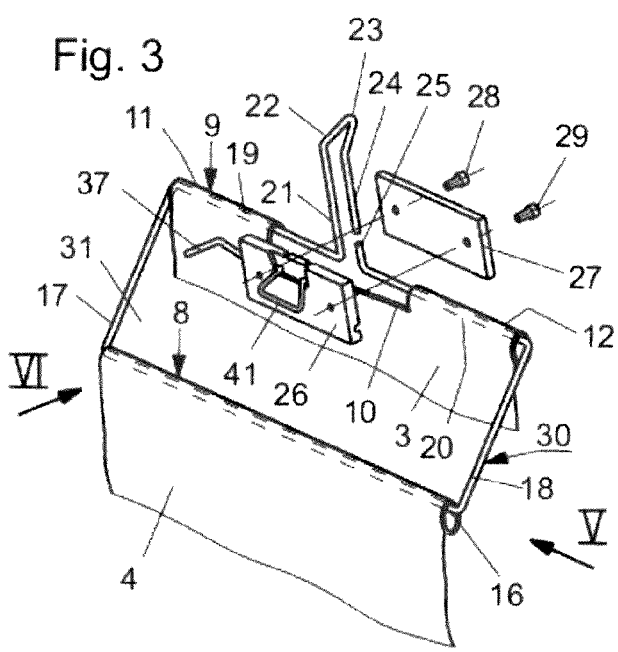
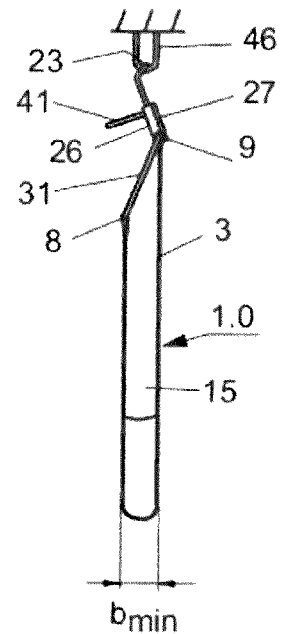
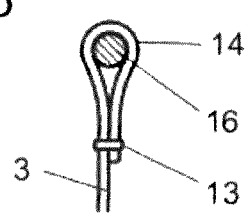

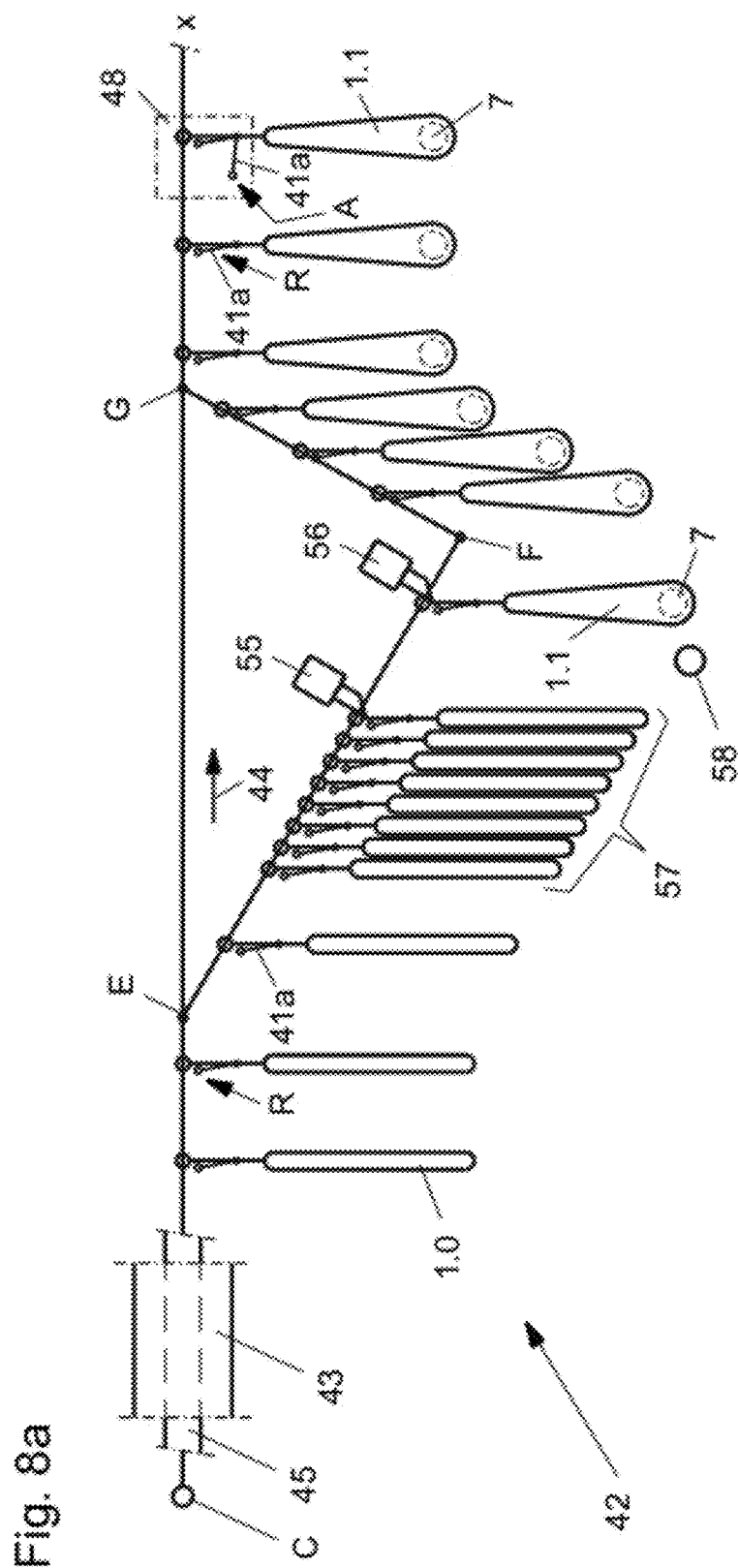

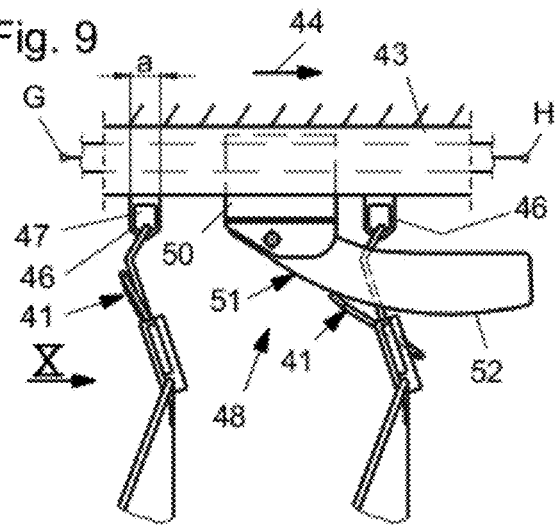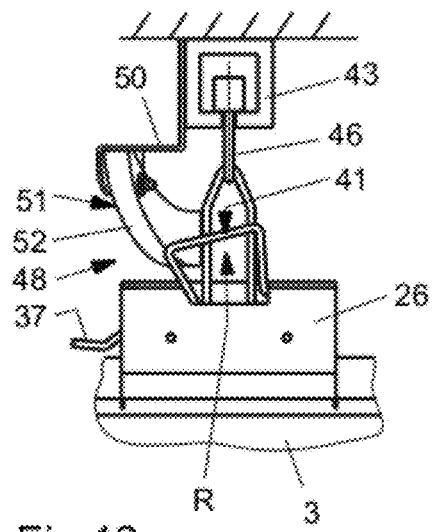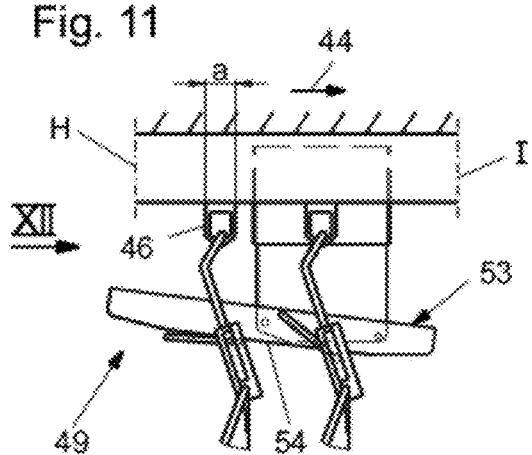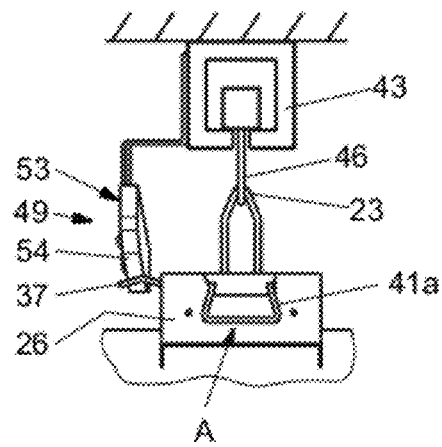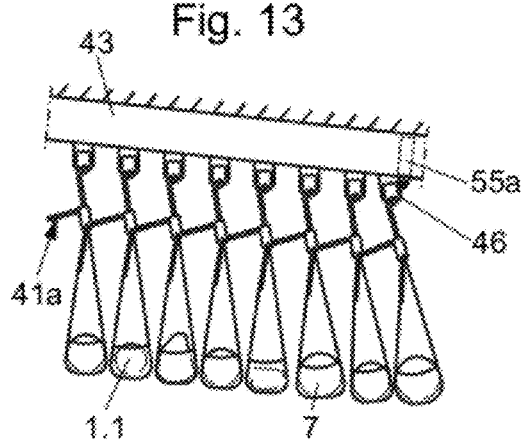

CONVEYOR INSTALLATION WITH CARRYING BAGS FOR PRODUCTS TO BE CONVEYED

FIELD OF THE INVENTION

The invention relates to a conveyor installation with carrying bags for products to be conveyed, in particular items of clothing.

BACKGROUND OF THE INVENTION

A conveyor installation with carrying bags for products to be conveyed is known from DE 10 2008 026 720 A1. The carrying bag has a frame with a sack fastened thereon to receive a product to be conveyed. Formed on the upper end of the frame is a carrying hook, which is hung in an eyelet of a carrier, which is displaceably mounted on a conveying rail. Furthermore, the frame is formed with a pivotable bow, with which the carrying bag is opened and provided for the loading of a product to be conveyed. With this configuration, the carrying bag, in an unloaded, in other words empty state, adopts a slim form with a smallest width in the conveying direction. In contrast to this, the carrying bag, in other words the sack, in the state loaded with the product to be conveyed, adopts a bulging form depending on the volume of the product to be conveyed up to a greatest width.

Handling carrying bags of this type in their loaded state is linked with difficulties when carrying bags adopt a position with hanging points located close to one another, such as in back-up sections, and the bulging sacks taking up more space here lead to a wedge-like accumulation and therefore to an oblique position of the carrying bags, as shown in FIG. 14.

Furthermore, a hanging conveying device for transporting products to be conveyed is known from DE 103 54 419 A1, in which symmetrically formed carriers for products to be conveyed are provided, which, with a corresponding loading with products to be conveyed, retain a vertical position. The drawback here is that the danger exists of catching or disruptions, particularly on inclined conveying sections, such as back-up sections of carriers for products to be conveyed that are located close to one another. These have the further drawback that the carriers for products to be conveyed take up a space of the same size regardless of the space requirement for items of products to be conveyed of different sizes.

Back-up sections are frequently configured as sections with a gradient of 2 to 5%, in which carriers receiving carrying bags are driven as a result of gravity or, in back-up sections running substantially horizontally, by a drive, such as is known, for example, from DE 40 17 821 C2. In both types of drive, backing-up forces act on backed-up carrying bags, which result in the carrying bags being pressed together, which is undesired in the case of certain types of products to be conveyed, for example in items of clothing. On the other hand, it is significant for the economic efficiency of a conveying plant that as large a number as possible of loaded or empty carrying bags can be backed up in back-up sections with structurally limited dimensions.

SUMMARY OF THE INVENTION

The invention is based on an object of providing a conveying plant with a sack which can be adapted to the space requirement of the products to be conveyed, which allows an orderly backing up of loaded carrying bags and therefore substantially keeps the products to be conveyed free of backing-up forces.

This object is achieved by a conveyor installation with carrying bags for products to be conveyed, in particular items of clothing, with a conveying section with carriers, which are moveable in a conveying rail in a conveying direction, to each receive a carrying bag,
wherein the carriers are displaceably arranged individually in the conveying rail,
wherein each carrying bag has a sack, in each case, with a width b in the conveying direction to receive products to be conveyed,
wherein for the width b in an unloaded state of the carrying bag, there applies: $b = b_{min}$, and
wherein for the width b in a loaded state of the carrying bag, there applies: $b = b_{max}$,
with at least one back-up section,
with a spacer, which is attached to each carrying bag and is adjustable between a rest position and a working position,
wherein, in the working position on the back-up section, the spacer rests on a carrying bag following in the conveying direction,
wherein the spacer is dimensioned such that, in the working position, for the horizontal spacing d of the adjacent carrying bag resting on the spacer, there applies:
$d \leq b_{max}$, and
wherein the position of the spacer is stable in the working position and in the rest position.

The configuration of the carrying bag with a spacer, which can be adjusted between two stable end positions, namely a working position and a rest position, allows optimal usage of space both when empty carrying bags are being backed up when the spacers are in the rest position and also during the backing up of loaded carrying bags when the spacers are in the working position. Furthermore, with the spacer located in the working position, a defined orientation of adjacent carrying bags is favored. A particular advantage is achieved by ensuring a minimum spacing of adjacent carrying bags, so that the products to be conveyed are substantially relieved of backing-up forces.

The development, in which there applies: $d = b_{max}$, ensures the complete elimination of backing-up forces even in such cases where exclusively products to be conveyed are conveyed with a space requirement corresponding to the greatest possible width of the sack in the conveying direction.

Further features, advantages and details of the invention emerge from the following description of an embodiment with the aid of the drawings.

BRIEF DESCRIPTION OF THE DRAWINGS

FIG. 1 shows a carrying bag of the conveyor installation with a closed feed opening in a perspective view, FIG. 2 shows a side view of the carrying bag in a view according to the viewing arrow II in FIG. 1, FIG. 3 shows a perspective view of the upper part of the carrying bag with the feed opening open in a view according to the viewing arrow III in FIG. 1 to a scale which is enlarged compared to FIG. 1, FIG. 4 shows a side view of the carrying bag corresponding to FIG. 2 with an opened feed opening, FIG. 5 shows a perspective view in accordance with the viewing arrow V in FIG. 3, FIG. 8a shows a first part of a conveyor installation in a schematic view, FIG. 10 shows a view of the first switching device in accordance with the viewing arrow X in FIG. 9, FIG. 11 shows a part view of the conveyor installation with a second switching device, FIG. 12 shows a view of the second switching device in accordance with the viewing arrow XII in FIG. 11, FIG. 13 shows a part view of a backing-up section of the conveyor installation according to the invention, and FIG. 14 shows a backing-up section of a conveyor installation in accordance with the prior art.

DESCRIPTION OF THE PREFERRED EMBODIMENT

Figure 6:
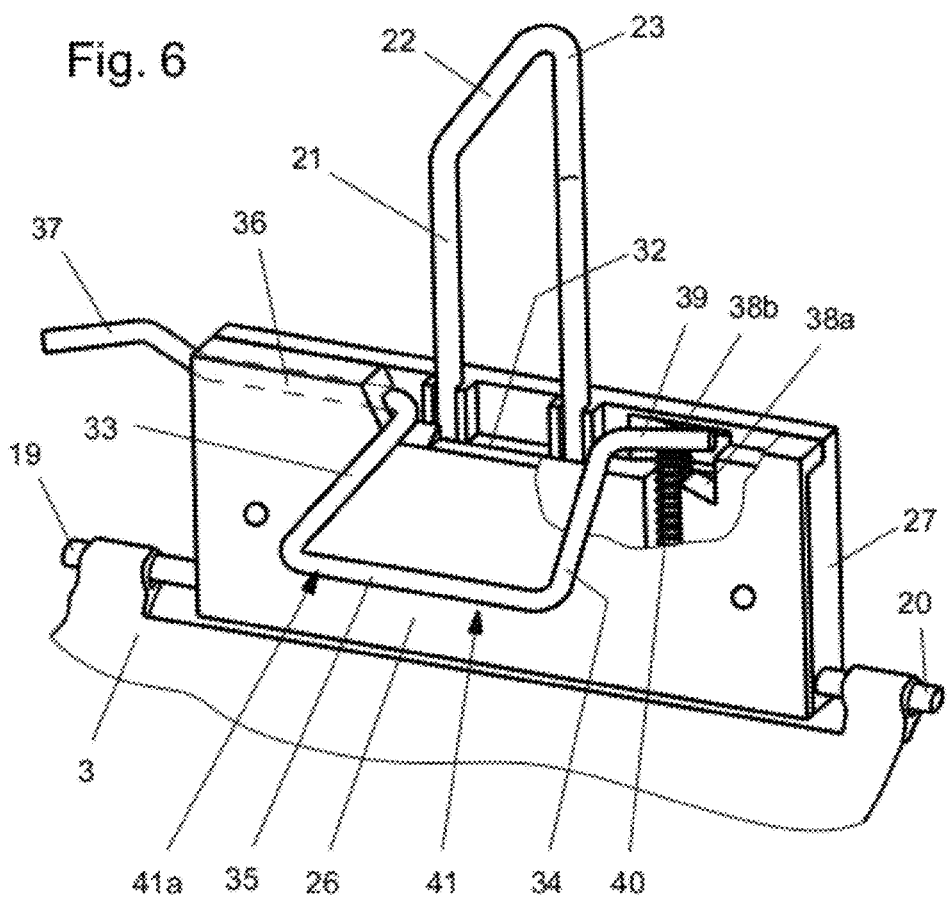
FIG. 6 shows a part detail of the carrying bag with a spacer in a working position in an enlarged perspective view in accordance with the viewing arrow VI in FIG. 3.

A carrying bag 1 has a semi-circular base 2 in cross-section and walls extending upwardly therefrom, namely a rear wall 3 and a front wall 4. The rear wall 3 extends further upwardly than the front wall 4. In the region of the base 2, the rear wall 3 and the front wall 4 are in each case connected to one another by means of a side wall 5 or 6. The rear wall 3 and the front wall 4 have a width a. The side walls 5 and 6 have a width b. The walls 3, 4, 5, 6 are arranged at right angles with respect to one another in cross-section. The base 2 and the walls 3 to 6 form an upwardly open carrying bag 15, in which a product 7 to be conveyed, for example an item of clothing, can be received. As can be inferred from FIG. 4, the carrying bag 1.0 designated 1.0 for this has a minimum width $b_{min}$. In the state shown in FIG. 2, loaded with a product 7 to be conveyed of maximum size, the carrying bag designated 1.1 for this has a maximum width $b_{max}$.

The front wall 4 has an upper edge 8 formed by a hem 14. The rear wall 3 has an upper edge 9, which is formed by hems 11, 12 and is interrupted by a central cutout 11. The hems 11, 12, 14 are in each case fixed by a seam 13, as can be inferred from FIG. 5 for the seam 14. The sack 15 formed by the base 2, the rear wall 3, the front wall 4 and the side walls 5, 6 consists of flexible materials, for example a woven fabric or a plastics material film; the sack 15 is therefore flexible.

The sack 15, at its upper end, has a carrying frame 30, by means of which a feed opening 31 is limited. This carrying frame 30 consists of a one-piece round rod made of steel. This rod—as can be seen, in particular, from FIG. 3—is bent to form a substantially rectangular frame. It has a transverse rod 16 arranged in the hem 14 of the front wall 4, two connecting rods 17, 18 bent at right angles from the ends thereof and leading to the rear wall 3 and two transverse rods 19, 20 located in the hem 9 and leading to the cutout 10. The transverse rods 19, 20 run parallel to the transverse rod 16. The connecting rods 17, 18 also run parallel to one another. A rod portion 21 is bent upwardly from the transverse rod 19. In its upper region, the rod portion 21 is provided with a bent portion 22. This bent portion 22 has the form of a V placed on its head, as can be inferred from FIGS. 6 and 7. The tip of the portion 22 forms a hanging point 23. A rod portion 24, which runs parallel to the rod portion 21, projects downwardly from the portion 22. A short rod portion 25, which runs aligned with the rod portion 24, is bent upwardly from the transverse rod 20. There is a small open gap between the two rod portions 24, 25—as can be seen from FIG. 3.

The mutually adjacent regions of the transverse rods 19, 20 and the rod portions 24, 25 and 21 are received in adapted recesses, only indicated in FIG. 3, of a block 26 consisting of plastics material and braced here by means of a plate-shaped pressure piece 27, which is fastened by screws 28, 29 in the form of countersunk screws to the block 26. The transverse rod 16, the connecting rods 17, 18, the transverse rods 19, 20 and the adjacent parts of the rod portions 21, 24, 25 and the block 26 with the pressure piece 27 form the carrying frame 30, already mentioned, which limits the feed opening 31. The sack 15 with the carrying frame 30 forms the carrying bag 1.

A spacer lever 41 is also pivotably mounted between the block 26 and the pressure piece 27. The spacer lever 41 is bent in one piece from a rod made of steel with a round cross section, in other words a so-called round steel. The spacer lever 41 has a spacer lever 41a, which is bent in an approximately U-shape, which has two legs 33, 34 and a web 35 connecting them. A bearing portion 36, which is arranged in a recess 38 of the block 26 and the end of which laterally emerging from the block 26 is configured as an actuating lever 37 bent in the manner of a crank arm, adjoins the leg 33. The block 26 and the pressure piece 27 thus form, for the spacer lever 41, a bearing housing, which is arranged approximately vertically in the hanging position of the carrying bag 1.

An abutment portion 39, which is mounted in a recess 38a of the block 26 and is upwardly loaded by a pre-stressed compression spring 40, adjoins the leg 34. This configuration means that the spacer lever 41 is held in two stable end positions. In a working position A shown in FIG. 6, the actual spacer 41a is in a horizontal position, in other words substantially projecting perpendicularly from the block 26. In this working position A, the bent actuating lever 37 is in its pivoted up position.

Figure 7:
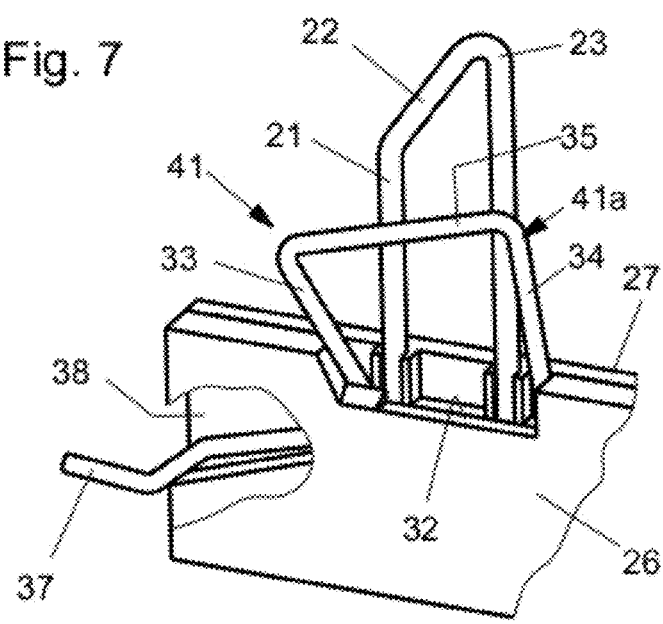
FIG. 7 shows a view corresponding to FIG. 6 with the spacer in a rest position.

In a second position shown in FIG. 7 and called the rest position R, the spacer lever 41a is in a substantially pivoted up position, while the crank arm 37 is located in a substantially pivoted down position. In the positions shown in FIGS. 6 and 7, the abutment portion 39 of the spacer lever 41 rests against the wall 38b of the recess 38a, specifically under the pressure of the compression spring 40. During the pivoting of the spacer lever 41 from the working position A into the rest position R and vice versa, the abutment portion 39 is lifted from the wall 38b against the force of the compression spring 40 and, after overcoming a dead centre located in the central pivoting region, is again pressed against the wall 38b. The position of the spacer lever 41 and therefore of the spacer 41a is therefore stable both in the working position A and in the rest position R, in other words secured against unintentional pivoting.

A conveyor installation 42 for transporting the carrying bags 1 has a stationary conveying rail 43 with a tensile member 45, which can be moved in the conveying direction 44 and entrains carriers 46 displaceably guided in the conveying rail 43. The tensile member 45 is driven by a motor, not shown.

The carriers 46 in each case have a window-like recess 47 extending in the conveying direction 44 and open transverse to the conveying direction 44.

The carrying bag 1 is fastened to the carrier 46, according to FIG. 7, before the block 26 is screwed to the pressure piece 27, as the rod portion 24 has to be introduced through the recess 47. The carriers 46 have an extent a, measured in the conveying direction 44, which is equal to or smaller than the smallest width $b_{min}$ of the unloaded carrying bag 1.0. Accordingly, the unloaded carrying bags 1.0 can be moved closely against one another, adjacent carriers 46 resting against on one another.

Figure 8B:
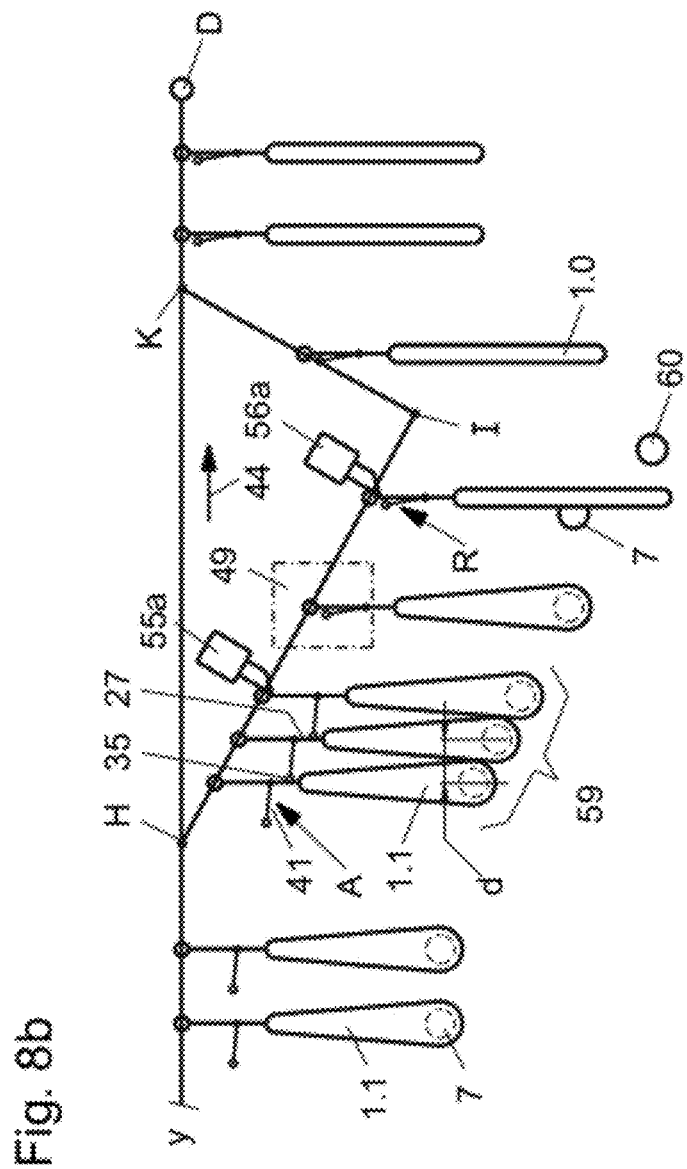
FIG. 8b shows the second part of the conveying adjoining the first part of the conveyor installation according to FIG. 8a, FIG. 9 shows a part view of the conveyor installation with a first switching device.

The conveyor installation 42 extends over a conveying section from a point C to a point D, which will be called a conveying section CD below. It is pointed out that the view according to FIGS. 8a and 8b is separated at the point x and y purely for space reasons, so the conveying section CD is to be regarded as uninterruptedly continuous.

The conveyor installation 42 has a branch section EF, which branches off at a first ejection point E from the conveying section CD and leads to a loading station 58. This branch section EF can be sloping, in other words without a drive for the carriers 46, so the latter slide down with the carrying bags 1.0 to the loading station 58. It furthermore has a first feed section FG, which leads from the end point F of the branch section EF to the conveying section CD and opens in a first introduction point G into the conveying section CD. If—as outlined above—the branch section EF is inclined to the end point F, the feed section FG generally has to be provided with a drive for carriers 46 with the carrying bags 1. The drive associated with the feed section FG for the carriers may, for example, be configured in accordance with DE 10 2005 006 455 A1.

A second branch section HI opens in the conveying direction 44 behind the first introduction point G from the conveying section CD and leads to an unloading station 60. A second feed section IK leads from the end point E of this branch section HI back to the conveying section CD. The second branch section leading from the second ejection point H to the end point I is basically constructed the same as the branch section EF. Accordingly, the second feed section IK leading to the second introduction point K is formed like the first feed section FG.

Arranged between the first introduction point G and the second ejection point H in the conveying section CD is a first switching device 48. A second switching device 49 is provided in the second branch section HI. The first switching device 48 has a first sliding surface 51 which is arranged by means of a holder 50 laterally and below the conveying rail 43 and has, on its lower side, a guide face 52 bent downwardly in the conveying direction 44. If a carrying bag 1 is conveyed through beneath this sliding surface 51, the region of the actual spacer 41a projecting laterally over the rod portion 21—as can clearly be inferred from FIGS. 9 and 10—abuts on the side face 52 and is pivoted from the pivoted up rest position into the pivoted down working position A. The crank arm 37 is pivoted here into the upper position.

The second switching device 49 has a second sliding surface 53, which is also arranged laterally and below the conveying rail 43, with a lower guide face 54. The guide face 54 is inclined downwardly in the conveying direction 44, as can be inferred from FIG. 11. If the crank arm 37 located in its pivoted up position runs onto this lower guide face 54 of the second sliding surface 53, it is pressed downwardly because of the incline of the guide face 54 in the conveying direction 43, whereby—as can in turn be inferred from FIG. 11—the spacer 41a is pivoted up from the working position A into the rest position R.

The branch sections EF and HI are in each case equipped with identical, known stop devices 55, 56 or 55a, 56a. They, in each case, have an electrically or electro-pneumatically activatable blocking element, with which the through-travel of a carrier 46 can be blocked or released by a control command.

The mode of working of the conveyor installation 42 will be described below primarily with the aid of FIG. 8a and FIG. 8b.

Empty carrying bags 1.0, in which the spacers 41a are located in accordance with the view in FIGS. 7 and 10 in the pivoted up rest position R, are conveyed on the conveying section CD in the conveying direction 44 to the first introduction point E where they are ejected and run on the branch section EF under gravity in the direction of the end point F. The stop device 55 blocks the carrying bags 1.0 from travelling through here, so carrying bags 1.0 are backed up in a space saving manner without any intermediate space with respect to one another. The region 57 between the first introduction point E and the stop device 55 forms a first back-up section 57. After a switching command from a central controller, the stop device 55 enables the first carrier 46 to travel through in the conveying direction 44 with the corresponding first carrying bag 1.0. The carrying bag 1.0 then travels to in front of the further stop device 56 arranged downstream of the first back-up section 57, so the corresponding carrying bag 1.0 stops at the loading station 58. A product 7 to be conveyed is then loaded into the carrying bag 1.0. With a switching command, the stop device 56 enables through-travel, so the loaded carrying bag 1.1 runs to the end point F of the branch section EF, where the carrier 46 with the loaded carrying bag 1.1 is passed to the feed section FG and is conveyed there to the first introduction point G. Onward conveyance then takes place on the conveying section CD. During the course of this conveyance, the carrying bag 1.1 runs through the first switching device 48, in which, in the manner already described, the spacer lever 41 is pivoted in such a way that the spacer 41a is brought to its pivoted down working position A.

On the conveying section CD, the carrying bags 1.0 or 1.1 can be conveyed at a spacing from one another, which can be seen, in particular, in FIGS. 8a and 8b and which is predetermined by the configuration of the tensile member 45 entraining the carriers 46. The spacing is generally so large that the spacer 41a located in the working position A does not abut against the pressure piece 27 of the following carrying bag 1.0 or 1.1, either. If, on the other hand, the loaded carrying bags 1.1 are ejected at the ejection point H onto the second branch section HI and run against the stop device 55a here, they are kept at a spacing d from one another in accordance with the view in FIG. 8b, which is predetermined by the horizontal extent of the spacer 41a, which rests with its web 35 against the pressure piece 27 of the carrying bag 1.1 following next. The region between the second ejection point H and the stop device 55a forms a second back-up section 59.

Individual carrying bags 1.1 are also released here one after the other by a corresponding activation of the stop device 55a and slide to in front of the stop device 56a, which is arranged downstream of the second back-up section 59 and is located at the unloading station 60. On the way to this stop device 56a, the carrying bag 1.1 runs through under the second switching device 49, where the spacer lever 41 is pivoted into its rest position R in the manner already described above.

After unloading, the carrying bag 1.1 is released by the stop device 56a and slides to the end point I. From there, it is brought back in the second feed section IK to the conveying section CD and conveyed onward there.

The position of the loaded carrying bags 1.1 in front of the stop device 55a is shown again in FIG. 13. On the other hand, FIG. 14 shows how the loaded carrying bags 1.1 would slide together in such a way that the carriers 46 are closely arranged in the conveying rail 43. The spacer levers 41 with the spacers 41a therefore lead to the loaded carrying bags 1.1 being able to be backed up in an orderly form.

The invention claimed is:

1. A conveyor installation with carrying bags (1, 1.0, 1.1) for products (7) to be conveyed, with a conveying section (CD) with carriers (46), which are moveable in a conveying rail (43) in a conveying direction (44), to each receive a carrying bag (1, 1.0, 1.1),
    wherein the carriers (46) are displaceably arranged individually in the conveying rail (43),
    wherein each carrying bag (1, 1.0, 1.1) has a sack (15), in each case, with a width b in the conveying direction (44) to receive products (7) to be conveyed,
    wherein for the width b in an unloaded state of the carrying bag (1.0), there applies: $b = b_{max}$, and
    wherein for the width b in a loaded state of the carrying bag (1.1), there applies: $b = b_{max}$,
with at least one back-up section (57, 59),
with a spacer (41a) of given length, which spacer (41a) is attached to each carrying bag (1, 1.0, 1.1) and is adjustable between a rest position (R) and a working position (A), said spacer (41a) in the working position (A) extending toward an adjacent bag and providing space between a bag to which said spacer is attached and said adjacent bag,
    wherein, in the working position (A) on the back-up section (59), the spacer (41) rests on a carrying bag (1.1) following in the conveying direction (44),
    wherein the spacer (41a) is dimensioned such that, in the working position (A), for the horizontal spacing d of the adjacent carrying bag (1.1) resting on the spacer (41a), there applies:
    $d = b_{max}$, and
    wherein the position of the spacer (41a) is stable in the working position (A) and in the rest position (R).

2. A conveyor installation according to claim 1,
wherein a first switching device (48) to adjust the spacer (41a) into the working position (A) is arranged upstream of the back-up section (59), and
wherein a second switching device (49) to adjust the spacer (41a) into the rest position (R) is arranged downstream of the back-up section (59).

3. A conveyor installation according to claim 1,
wherein at least one of said first and said second switching device (48, 49) has a sliding surface (51, 53) with a guide face (52, 54), which adjusts the spacer (41a).

4. A conveyor installation according to claim 1,
wherein the spacer (41a) is mounted in a bearing housing (26, 27), which is arranged in an upper region of the carrying bag (1, 1.0, 1.1), to be pivotable between the working position (A) and the rest position (R).

5. A conveyor installation according to claim 1,
wherein at least one of said first and said second switching device (48, 49) has a sliding surface (51, 53) with a guide face (52, 54), which adjusts the spacer (41a),
wherein the spacer (41a) is mounted in a bearing housing (26, 27), which is arranged in an upper region of the carrying bag (1, 1.0, 1.1), to be pivotable between the working position (A) and the rest position (R), and
wherein the spacer (41a) is provided with an actuating lever (37), which is laterally guided out of the bearing housing (26, 27 and is bent in the manner of a crank arm and which actuating lever (37) is provided with a guide face (54) to pivot the spacer (41a).

6. A conveyor installation according to claim 1,
wherein at least one of said first and said second switching device (48, 49) has a sliding surface (51, 53) with a guide face (52, 54), which adjusts the spacer (41a),
wherein the spacer (41a) is mounted in a bearing housing (26, 27), which is arranged in an upper region of the carrying bag (1, 1.0, 1.1), to be pivotable between the working position (A) and the rest position (R), and
wherein the spacer (41a) is directly abutable to a guide face (52) of a sliding surface (51) to pivot the spacer (41a).

7. A conveyor installation according to claim 1,
wherein on the back-up section (59), the spacer (41a) of a carrying bag (1.1) rests against a pressure piece (27) of a directly following carrying bag (1.1).

8. A conveyor installation according to claim 1,
wherein at least switching device (48, 49) has a sliding surface (51, 53) with a guide face (52, 54), which adjusts the spacer (41a),
wherein on the back-up section (59), the spacer (41a) of a carrying bag (1.1) rests against a pressure piece (27) of a directly following carrying bag (1.1), and
wherein the pressure piece (27) is part of the bearing housing (26, 27).

9. A conveyor installation according to claim 1,
wherein the spacer (41a) is mounted in a bearing housing (26, 27), which is arranged in an upper region of the carrying bag (1, 1.0, 1.1), to be pivotable between the working position (A) and the rest position (R), and
wherein the spacer (41a) in the bearing housing (26, 27) has an abutment portion (39), which is loaded by means of a compression spring (40) in such a way that the spacer (41a) is held secured against unintentional pivoting in one of the working position (A) and the rest position (R).

* * * * *

UNITED STATES PATENT AND TRADEMARK OFFICE
CERTIFICATE OF CORRECTION

PATENT NO. : 8,672,118 B2  Page 1 of 1
APPLICATION NO. : 13/399398
DATED : March 18, 2014
INVENTOR(S) : Paul Janzen et al.

It is certified that error appears in the above-identified patent and that said Letters Patent is hereby corrected as shown below:

On the title page item (73) Assignee, correct the incorrect assignee's name by deleting "Duekopp Foerdertecknik GmbH" and insert --Dürkopp Fördertechnik GmbH--.

Signed and Sealed this
Fifteenth Day of July, 2014

Michelle K. Lee
*Deputy Director of the United States Patent and Trademark Office*